(12) United States Patent
Nishino et al.

(10) Patent No.: US 10,530,477 B2
(45) Date of Patent: Jan. 7, 2020

(54) VISIBLE LIGHT COMMUNICATION APPARATUS

(71) Applicant: Panasonic Intellectual Property Management Co., Ltd., Osaka (JP)

(72) Inventors: Hiroyuki Nishino, Osaka (JP); Hiromichi Goto, Osaka (JP); Kazuo Itoh, Osaka (JP); Shojiro Kido, Osaka (JP); Teruhito Takeda, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/281,142

(22) Filed: Feb. 21, 2019

(65) Prior Publication Data

US 2019/0268069 A1    Aug. 29, 2019

(30) Foreign Application Priority Data

Feb. 23, 2018  (JP) ................. 2018-031365

(51) Int. Cl.
*H04B 10/116* (2013.01)
*H04B 10/50* (2013.01)
(Continued)

(52) U.S. Cl.
CPC ......... *H04B 10/116* (2013.01); *H04B 10/502* (2013.01); *H04B 10/54* (2013.01);
(Continued)

(58) Field of Classification Search
CPC .... H04B 10/116; H04B 10/502; H04B 10/54;
H04B 10/50; H05B 33/0815; H05B 33/0854; H05B 33/089; H05B 37/0218; H05B 33/0866; H05B 33/0818; H05B 33/0872; G03G 15/00; H02H 7/122;
(Continued)

(56) References Cited

U.S. PATENT DOCUMENTS 7,898,315 B2 *   3/2011   Saito ................. H03K 17/002
                                                    327/407
8,374,003 B2 *   2/2013   Matsumoto ....... H02M 3/33592
                                                    363/21.01
(Continued)

FOREIGN PATENT DOCUMENTS

JP        2017-139211 A    8/2017

*Primary Examiner* — Abbas H Alagheband
(74) *Attorney, Agent, or Firm* — Renner, Otto, Boisselle & Sklar, LLP

(57) ABSTRACT

A visible light communication apparatus includes: an on/off switch connected in series to a load circuit including a light emitting diode; an impedance circuit connected in series to the on/off switch; a feedback circuit that feeds back an error between a voltage drop across the impedance circuit and a reference voltage potential to a voltage source as a feedback signal; a drive circuit that turns on and off the on/off switch in accordance with a communication signal which is a binary signal; an isolation circuit that transmits power while being electrically isolated; and an auxiliary power supply circuit that is connected between two output terminals of the voltage source, generates an auxiliary supply voltage, and supplies power based on the auxiliary supply voltage generated to the on/off switch and the drive circuit via the isolation circuit.

8 Claims, 16 Drawing Sheets

(51) Int. Cl.
*H04B 10/54* (2013.01)
*H05B 33/08* (2006.01)

(52) U.S. Cl.
CPC ....... *H05B 33/089* (2013.01); *H05B 33/0815* (2013.01); *H05B 33/0854* (2013.01)

(58) Field of Classification Search
CPC ............ H02J 7/00; H02M 3/24; H02M 3/335; H02M 7/537
USPC .......................................................... 398/172
See application file for complete search history.

(56) References Cited

U.S. PATENT DOCUMENTS

| | | | | |
|---|---|---|---|---|
| 8,531,163 B2* | 9/2013 | Chen | ........................ | H02M 1/36 |
| | | | | 323/222 |
| 8,680,788 B2* | 3/2014 | Esaki | ................. | H05B 33/0818 |
| | | | | 315/209 R |
| 9,084,318 B2* | 7/2015 | Yao | .................... | H05B 33/0815 |
| 9,131,563 B2* | 9/2015 | Kunimatsu | ........ | H05B 33/0815 |
| 9,357,597 B2* | 5/2016 | Nakamura | ............ | F21S 41/663 |
| 9,451,679 B2* | 9/2016 | Nishino | ............. | H04B 10/1149 |
| 9,723,666 B2* | 8/2017 | Nakajo | .................... | H02M 1/36 |
| 9,814,115 B2* | 11/2017 | Kido | .................... | H04B 10/116 |
| 10,015,849 B2* | 7/2018 | Liu | ........................... | H02J 1/02 |
| 10,038,502 B1* | 7/2018 | Seki | ...................... | H04B 10/116 |
| 10,090,777 B2* | 10/2018 | Dent | ....................... | H02J 3/383 |
| 2008/0018261 A1* | 1/2008 | Kastner | .................... | F21V 23/00 |
| | | | | 315/192 |
| 2010/0109571 A1* | 5/2010 | Nishino | .............. | H02M 1/4208 |
| | | | | 315/307 |
| 2011/0101915 A1* | 5/2011 | Mitsutani | ................ | B60K 6/445 |
| | | | | 320/109 |
| 2012/0051757 A1* | 3/2012 | Nishino | .............. | H04B 10/1149 |
| | | | | 398/201 |
| 2013/0015785 A1* | 1/2013 | Kamada | ............... | H04B 10/116 |
| | | | | 315/297 |
| 2015/0249397 A1* | 9/2015 | Ogasawara | ......... | H02M 1/4266 |
| | | | | 315/200 R |
| 2017/0188420 A1* | 6/2017 | Kido | .................... | H04B 10/116 |

* cited by examiner

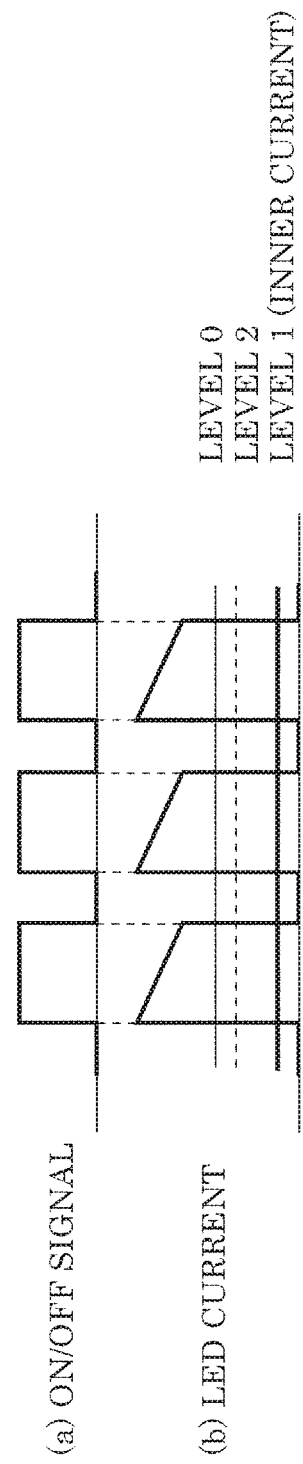

VISIBLE LIGHT COMMUNICATION APPARATUS

CROSS REFERENCE TO RELATED APPLICATION

This application claims the benefit of priority of Japanese Patent Application Number 2018-031365 filed on Feb. 23, 2018, the entire content of which is hereby incorporated by reference.

BACKGROUND

1. Technical Field

The present disclosure relates to a visible light communication apparatus that performs visible light communication by modulating illumination light.

2. Description of the Related Art

Japanese Unexamined Patent Application Publication No. 2017-139211 discloses a visible light communication apparatus that transmits a visible light communication signal by on/off modulating illumination light in a lighting device including a light-emitting diode (LED) as a light source.

SUMMARY

The above conventional technique, however, has a problem that the LED current is smaller by an amount of current flowing through a modulator (hereinafter, referred to as inner current) when visible light communication is performed by intermittently interrupting LED current than when the visible light communication is not performed, thereby deteriorating dimming performance, specifically dimming performance in a dark area. For example, when there are the same types of lighting devices, some of which perform the visible light communication and the rest of which do not, unbalance of illumination light occurs due to dimming, and a user feels something is wrong.

It should be noted that "when the visible light communication is not performed" means, for example, the case without a modulator for visible light communication. "When the visible light communication is performed" means, for example, the case with the above modulator.

An object of the present disclosure is to provide a visible light communication apparatus which reduces the deterioration of dimming performance between when the visible light communication is performed and when the visible light communication is not performed.

In view of the foregoing problem, a visible light communication apparatus according to an aspect of the present disclosure includes: a voltage source; a smoothing circuit connected to the voltage source; a load circuit connected to the voltage source and including a light emitting diode; an on/off switch connected in series to the load circuit; an impedance circuit connected in series to the load circuit and the on/off switch; a feedback circuit that feeds back an error between a voltage drop across the impedance circuit and a reference voltage potential to the voltage source as a feedback signal; a signal source that generates a communication signal which is a binary signal; a drive circuit that turns on and off the on/off switch in accordance with the communication signal; an isolation circuit that transmits power while being electrically isolated; and an auxiliary power supply circuit that is connected between two output terminals of the voltage source, generates an auxiliary supply voltage, and supplies power based on the auxiliary supply voltage generated to the on/off switch and the drive circuit via the isolation circuit.

With the visible light communication apparatus according to the present disclosure, it is possible to reduce the deterioration of dimming performance between when the visible light communication is performed and when the visible light communication is not performed.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 9 is a diagram schematically illustrating the waveforms of an on/off signal and LED current according to comparative example 1;

DETAILED DESCRIPTION OF THE EMBODIMENTS

Underlying Knowledge Forming Basis of the Present Disclosure

The present inventor has found the following problems about the visible light communication apparatus described in "Description of the Related Art".

Figure 8A:
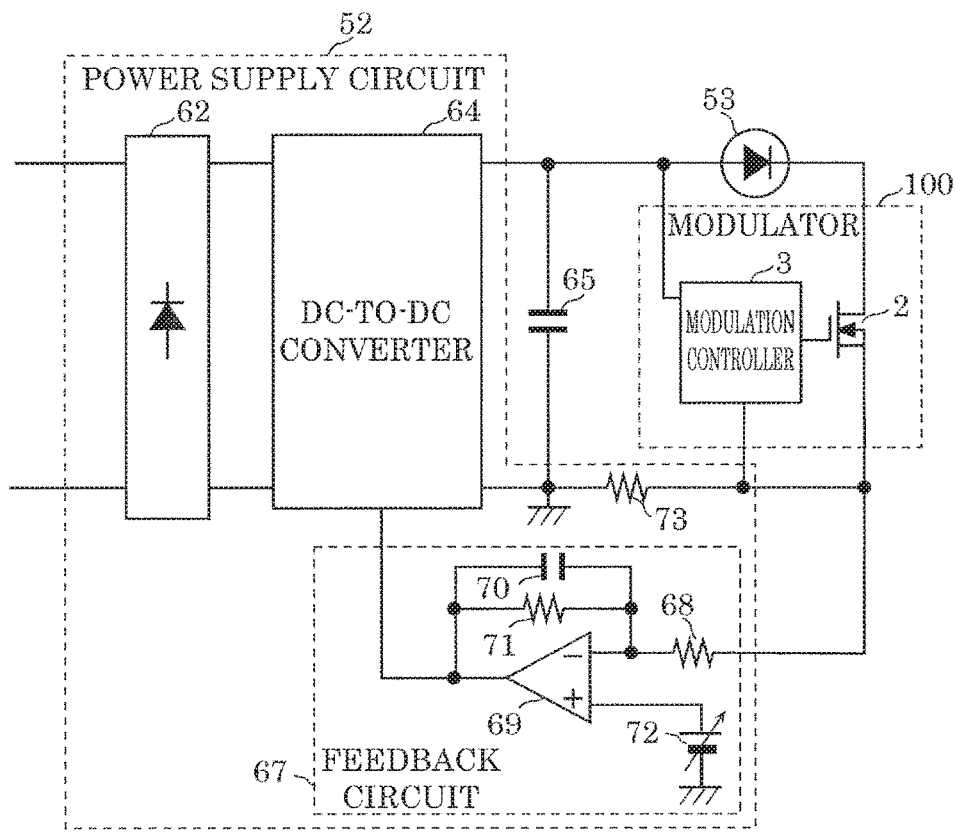
FIG. 8A is a block diagram illustrating an exemplary configuration of a visible light communication apparatus according to comparative example 1 based on the present inventor's knowledge.

FIG. 8A is a block diagram illustrating an exemplary configuration of a visible light communication apparatus according to comparative example 1 based on the present inventor's knowledge. The visible light communication apparatus of this figure includes power supply circuit 52, load circuit 53, smoothing capacitor 65, and modulator 100.

In power supply circuit 52, rectifier bridge 62 full-wave rectifies an input from commercial power source 60, the rectified input is provided to DC-to-DC converter 64 including a smoothing mean, and smoothing capacitor 65 is connected between the output terminals of DC-to-DC converter 64. A series circuit of impedance circuit 73 which is a resistor for detecting a current and load circuit 53 including a light-emitting diode which emits illumination light is formed parallel to smoothing capacitor 65. The voltage across impedance circuit 73 which is the detection resistor is fed back to the controller of DC-to-DC converter 64 via feedback circuit 67, and DC-to-DC converter 64 serves as a constant current generator configured to maintain the average of output current constant.

It should be noted that feedback circuit 67 includes error amplifier 69, reference voltage source 72, and resistor 71 and capacitor 70 which are connected between the output terminal and the negative input terminal of error amplifier 69.

With this configuration, the dimming function can be achieved by changing the reference voltage potential generated by reference voltage source 72. In other words, as the reference voltage potential is decreased from a value at 100% lighting, a voltage drop across impedance circuit 73 decreases, thereby reducing the LED load current.

When the visible light communication is performed using such power supply circuit 52, modulator 100 is connected in series to load circuit 53, and modulation controller 3 turns on and off on/off switch 2 using a binary communication signal (also referred to as an on/off signal) generated in modulation controller 3 to intermittently interrupt the LED current.

Figure 8B:
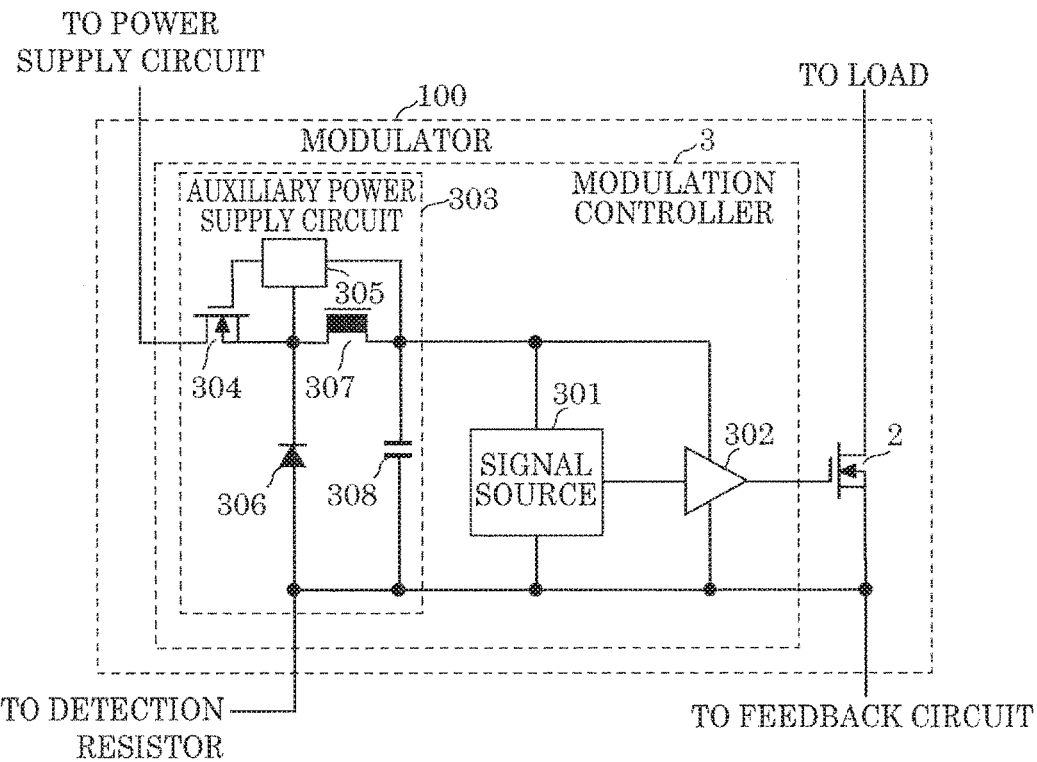
FIG. 8B is a circuit diagram illustrating an exemplary configuration of a modulator according to comparative example 1.

FIG. 8B is a circuit diagram illustrating an exemplary configuration of modulator 100 according to comparative example 1. This modulator 100 includes on/off switch 2 and modulation controller 3. Modulation controller 3 includes signal source 301, drive circuit 302, and auxiliary power supply circuit 303. Signal source 301 generates the above communication signal. Drive circuit 302 is a buffer circuit which provides the communication signal from signal source 301 to on/off switch 2 as a drive signal for turning on and off on/off switch 2. Auxiliary power supply circuit 303 supplies operating power to signal source 301 and drive circuit 302. Auxiliary power supply circuit 303 is connected in parallel to the series circuit of load circuit 53 and on/off switch 2 since auxiliary power supply circuit 303 can add the visible light communication function to an existing lighting device, and easily turn on and off on/off switch 2. Auxiliary power supply circuit 303 is configured as a step-down converter, and includes switching element 304, its drive circuit 305, inductor 307, regenerative diode 306, and smoothing capacitor 308.

FIG. 9 is a diagram schematically illustrating the waveforms of an on/off signal and LED current according to comparative example 1. The on/off signal shown in (a) of this figure is the communication signal generated from signal source 301. The LED current shown in (b) is the current flowing through load circuit 53.

The level 0 of this figure represents the LED current (averaged) when the visible light communication apparatus according to comparative example 1 does not include modulator 100 and the LED current is not intermittently interrupted.

When on/off switch 2 is turned on and off in accordance with the binary on/off signal (a), the current flowing through load circuit 53 has a pulse-shaped waveform with overshoot like the LED current shown in (b) of FIG. 9. In this case, regardless of the waveform, if the on/off period is set to be sufficiently shorter than an integration-circuit time constant of feedback circuit 67, the average of current is equal to the level 0 at which the current is not intermittently interrupted by the feedback control.

The level 1 of this figure represents the average of inner current flowing through modulator 100 shown in FIG. 8B.

The level 2 of this figure represents the LED current (averaged) when the LED current is intermittently interrupted in the visible light communication apparatus according to comparative example 1. The above inner current does not pass through load circuit 53, and thus the average of LED current decreases by the amount of inner current. In other words, the level 2=(level 0)–(level 1). Regardless of which path the current flows through, feedback circuit 67 controls the average of total current to maintain a predetermined value, and thus the LED current loss increases with an increase in the inner current. The decrease in the average of LED current causes a decrease in the visual brightness of illumination light.

Figure 10:
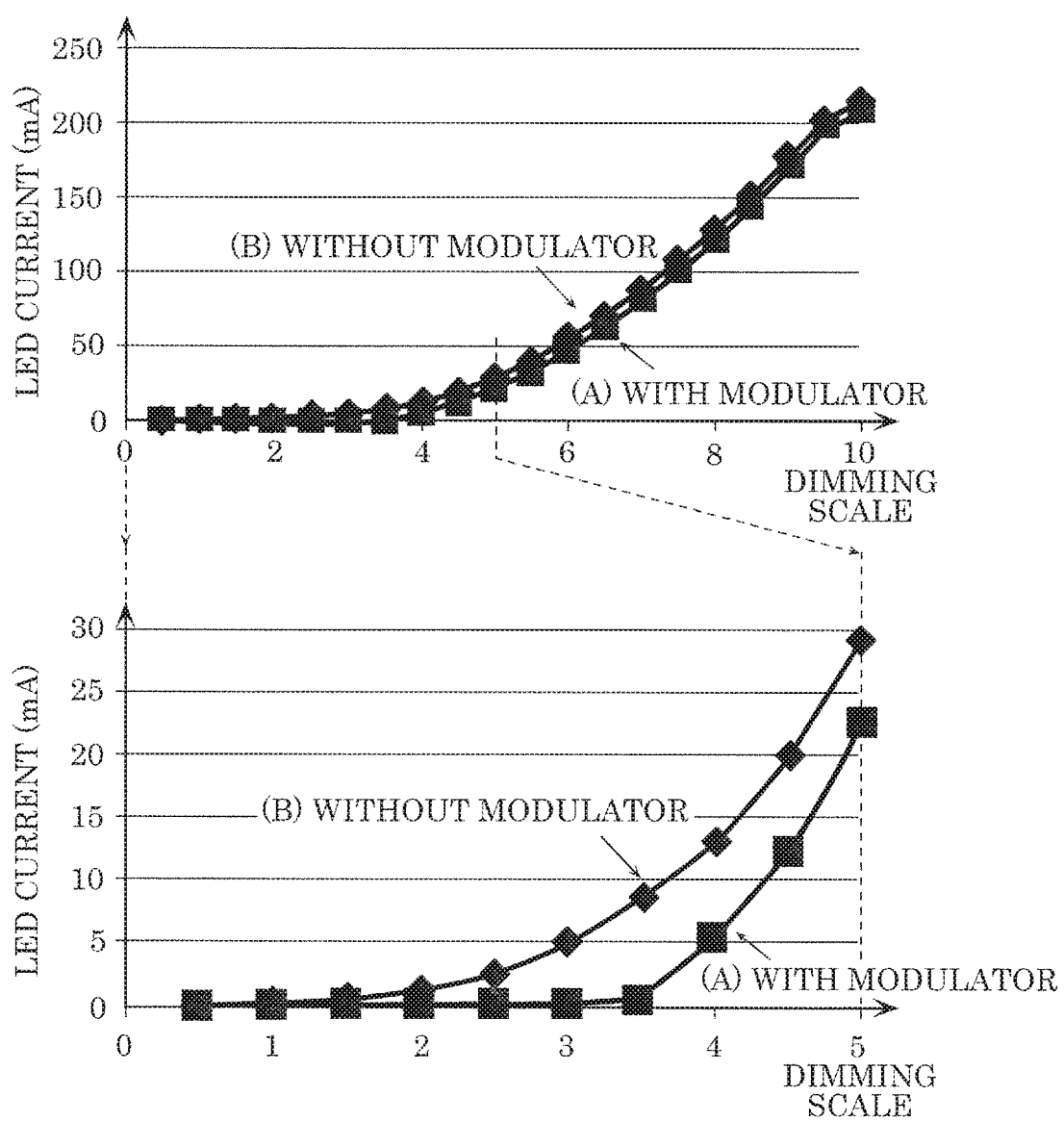
FIG. 10 is a diagram illustrating a load current versus a dimming scale according to comparative example 1.

FIG. 10 is a diagram illustrating a LED current versus a dimming scale according to comparative example 1. The dimming scale indicates the position of a finger turned or slide knob which receives dimming control by a user. Here, the dimming scale of 10 corresponds to the dimming ratio of 100%, and the dimming scale of 0 corresponds to the dimming ratio of 0%.

In FIG. 10, it is assumed that load circuit 53 and power supply circuit 52 have an average current of about 210 mA at 100% lighting (the dimming scale of 10). FIG. 10 shows the results of measuring the relationship between the dimming level (the dimming scale of from 0 to 10) and the average of LED current in both cases: (A) with modulator 100; and (B) without modulator 100. It should be noted that the inner current of modulator 100 used here is about 6 mA.

As shown in the upper half of FIG. 10, there is no significant difference between (A) and (B), but the line of (A) (with modulator 100) is shifted below the line of (B) by the amount of inner current over the entire range of dimming scales.

The lower half of FIG. 10 is an enlarged view of the region below the dimming scale of 5 (14% dimming) in the upper half. From (A) (with modulator 100), it is found that the smooth dimming performance deteriorates around the dimming scales of 1 to 4 and the brightness is different between (A) and (B) even if their dimming scales are the same.

Figure 11:
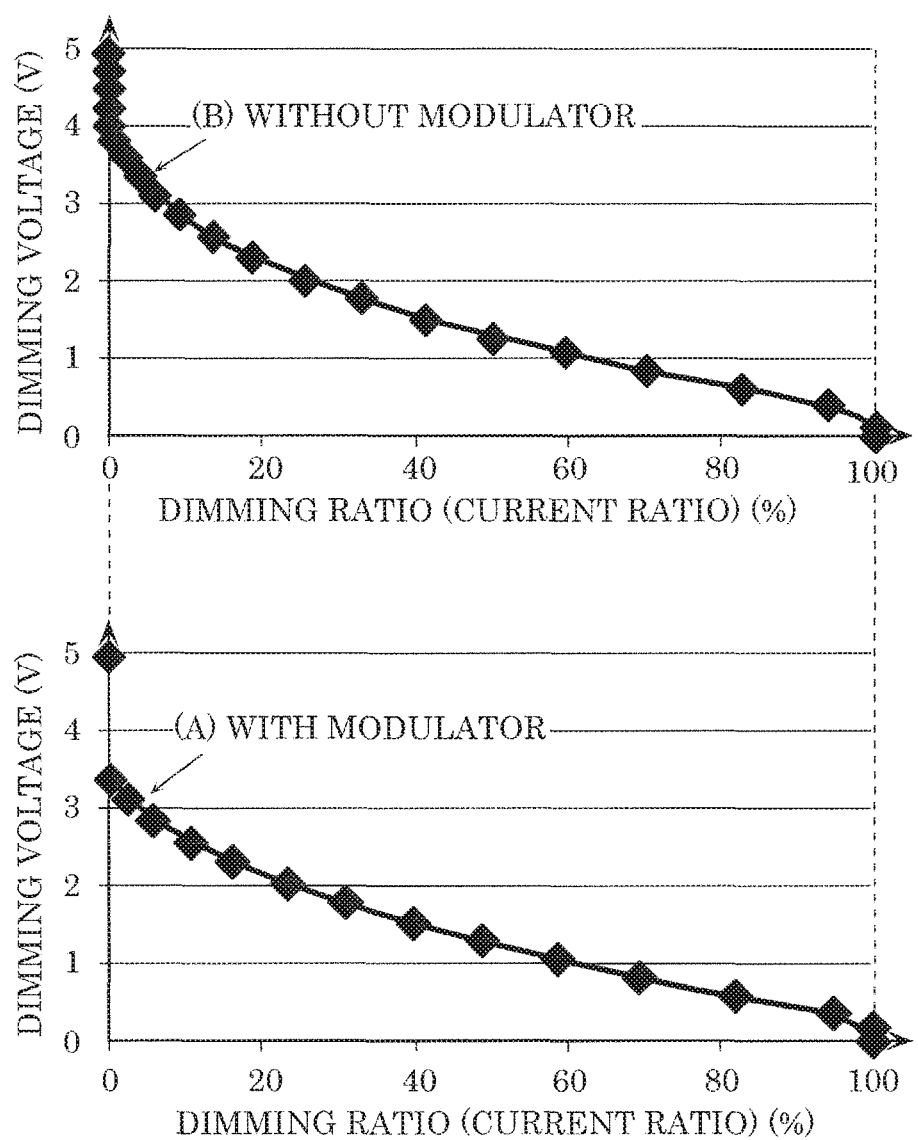
FIG. 11 is a diagram illustrating a load current versus a dimming ratio according to comparative example 1.

FIG. 11 is a diagram illustrating a LED current versus a dimming ratio according to comparative example 1. FIG. 11 shows the results of measuring the relationship between a signal from a dimmer (a dimming voltage) and a dimming ratio under the same conditions as FIG. 10. The dimming voltages of 0 to 5 V correspond to the dimming scales of 10 to 0, respectively, and they are proportional. The dimming ratio (%) is defined as a ratio of a current to the average of LED current at 100% lighting (the dimming scale of 10, the dimming voltage of 0 V). It is found that the dimming controllability in (A) with modulator 100 (the lower half of FIG. 11) deteriorates at the dimming voltage higher than or equal to 3.3 V in comparison with (B) without modulator 100 (the upper half of FIG. 11). In other words, the dimming performance deteriorates in a dark area. As described above, (A) with a modulator for visible light communication and (B) without the modulator differ in the dimming performance specifically in a dark area. Stated differently, there is a problem that the dimming performance deteriorates by including the modulator for visible light communication.

Figure 12A:
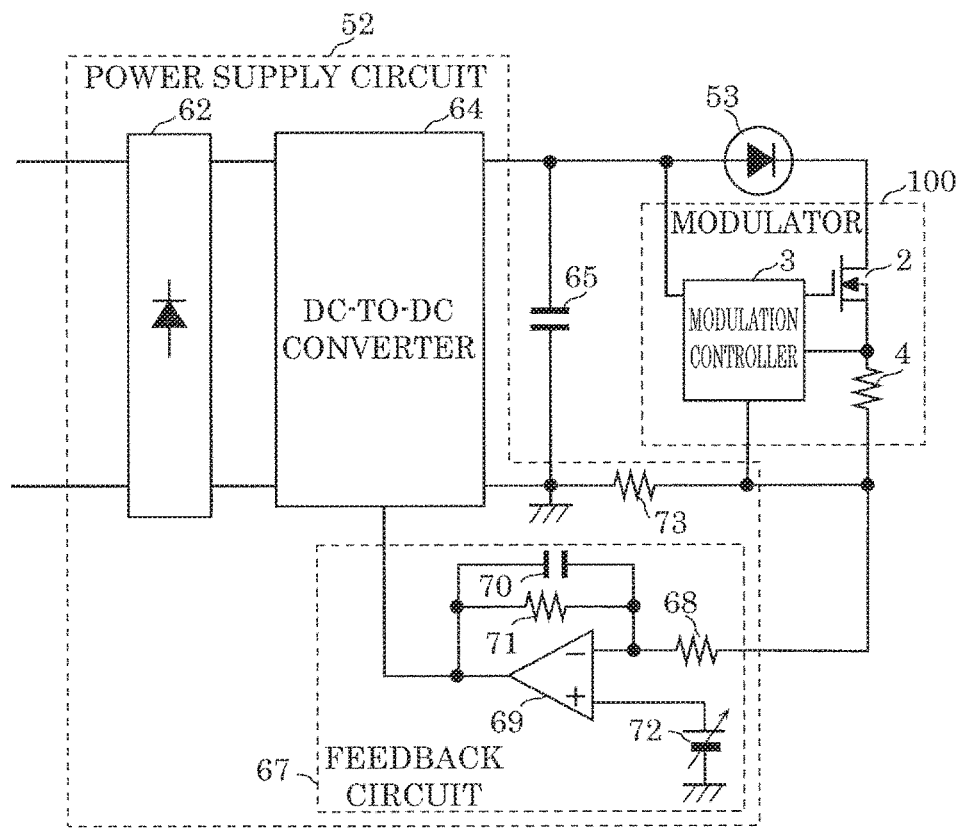
FIG. 12A is a block diagram illustrating an exemplary configuration of a visible light communication apparatus according to comparative example 2 based on the present inventor's knowledge.

FIG. 12A is a block diagram illustrating an exemplary configuration of a visible light communication apparatus according to comparative example 2 based on the present inventor's knowledge. FIG. 12A differs from FIG. 8A in that current detection resistor 4 is added and the configuration of drive circuit 302 is different. Hereinafter, the differences will be described in detail.

Current detection resistor 4 is connected in series to load circuit 53 and on/off switch 2, and is for detecting a LED current (here, this is the same as a current flowing through current detection resistor 4 itself).

Drive circuit 302 has a function of providing a communication signal from signal source 301 to on/off switch 2 as a driving signal for turning on and off on/off switch 2, and a function of controlling current of on/off switch 2 based on a voltage potential detected by current detection resistor 4.

Figure 12B:
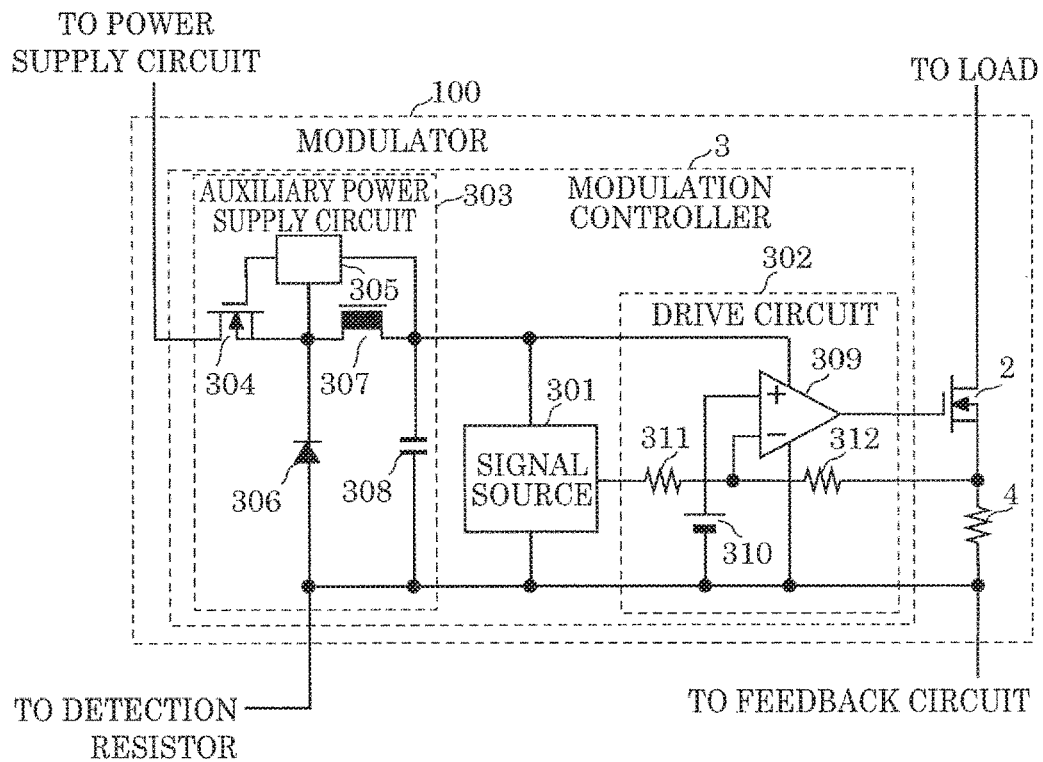
FIG. 12B is a circuit diagram illustrating an exemplary configuration of a modulator according to comparative example 2.

FIG. 12B is a circuit diagram illustrating an exemplary configuration of modulator 100 according to comparative example 2. On/off switch 2 is activated by operational amplifier 309 which has a positive terminal receiving the reference voltage potential of reference voltage source 310 and a negative terminal receiving a voltage potential resulting from the voltage drop across current detection resistor 4 divided by resistor 311 and resistor 312. With this, drive circuit 302 prevents the current flowing during the on period of on/off switch 2 from exceeding an intended level. The intended level is determined by the reference voltage potential of reference voltage source 310. The intended level and the reference voltage potential are set to suppress the overshoot in the waveform of LED current as shown in (b) of FIG. 9.

Figure 13:
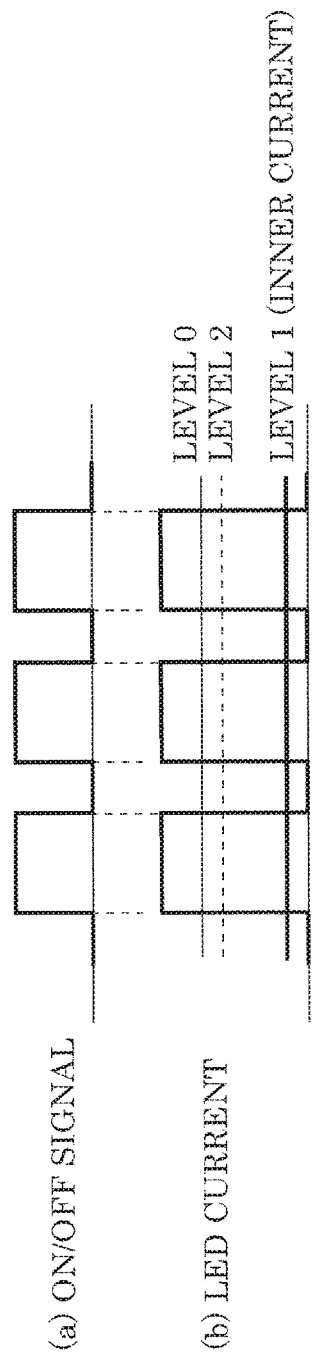
FIG. 13 is a diagram schematically illustrating the waveforms of an on/off signal and LED current according to comparative example 2.

FIG. 13 is a diagram schematically illustrating the waveforms of an on/off signal and LED current according to comparative example 2.

The level 0 of this figure represents the LED current (averaged) when a visible light communication apparatus according to comparative example 2 does not include modulator 100 and the LED current is not intermittently interrupted. When the load current is intermittently interrupted in accordance with the binary on/off signal (a), the LED current (b) has a square-shaped waveform as shown in this figure.

The level 1 of this figure represents the average of inner current flowing into auxiliary power supply circuit 303 shown in FIG. 12B. The above inner current does not pass through load circuit 53, and thus the average of LED current decreases by the amount of inner current. In other words, when the LED current is intermittently interrupted, the LED current (averaged) is expressed by level 2=(level 0)−(level 1). Such a decrease in the average of LED current causes a decrease in the visual brightness of illumination light.

Also when the current control function as shown in FIG. 12B is added and current is intermittently interrupted, the relationship between the dimming scale and the LED current and the relationship between the dimming ratio and the dimming voltage are almost the same as FIG. 10 and FIG. 11, respectively. When modulator 100 exists, the smooth dimming performance deteriorates in a deep dimming region (i.e. a dark area).

Figure 14:
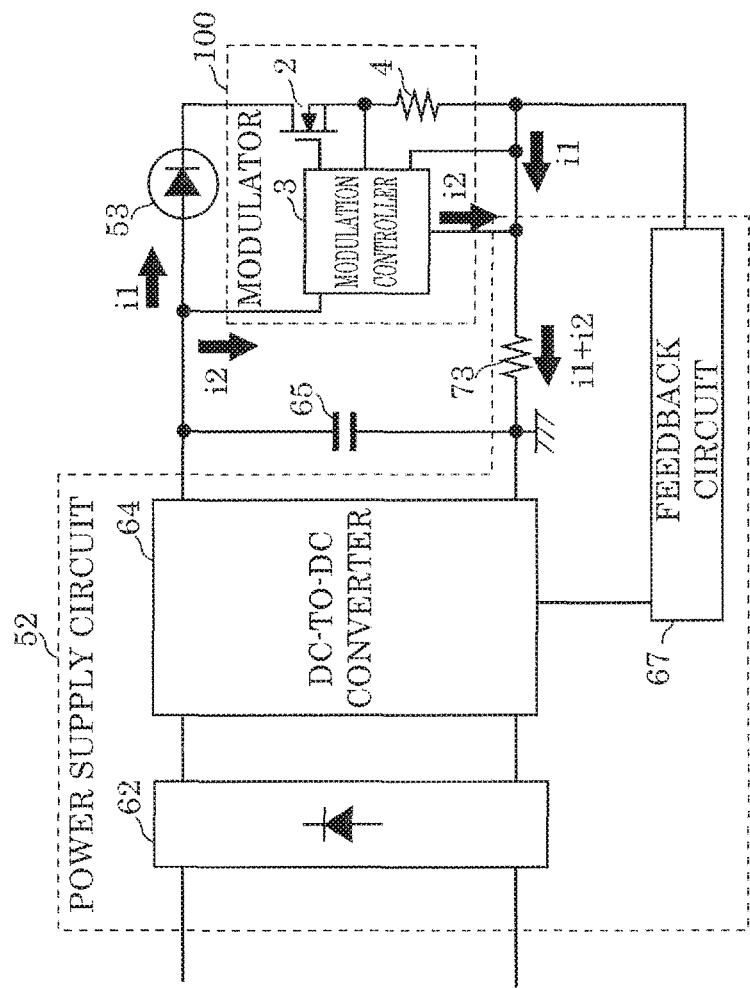
FIG. 14 is a diagram illustrating a current path in the modulator according to comparative example 2.

Next, the foregoing problem will be further described with reference to FIG. 14. FIG. 14 is a diagram illustrating a current path in modulator 100 according to comparative example 2. In FIG. 14, the current path for each part is added to FIG. 12A. The output current from the voltage source (DC-to-DC converter 64) is divided into current i1 flowing into load circuit 53 and current i2 flowing into modulation controller 3 in modulator 100. These currents meet and flow through impedance circuit 73 serving as a current detection resistor. In other words, the summed current (i1+i2) flows through impedance circuit 73. The voltage drop controls, as a signal representing the LED current, the output from the voltage source (DC-to-DC converter 64) via feedback circuit 67. As described above, also in the visible light communication apparatus according to comparative example 2, the LED current becomes smaller by the amount of inner current i2 than the case without modulator 100. Accordingly, also in the visible light communication apparatus according to comparative example 2, the dimming performance deteriorates when the visible light communication is performed, in comparison with when the visible light communication is not performed.

In order to solve such a problem, a visible light communication apparatus according to an aspect of the present disclosure includes: a voltage source; a smoothing circuit connected to the voltage source; a load circuit connected to the voltage source and including a light emitting diode; an on/off switch connected in series to the load circuit; an impedance circuit connected in series to the load circuit and the on/off switch; a feedback circuit that feeds back an error between a voltage drop across the impedance circuit and a reference voltage potential to the voltage source as a feedback signal; a signal source that generates a communication signal which is a binary signal; a drive circuit that turns on and off the on/off switch in accordance with the communication signal; an isolation circuit that transmits power while being electrically isolated; and an auxiliary power supply circuit that is connected between two output terminals of the voltage source, generates an auxiliary supply voltage, and supplies power based on the auxiliary supply voltage generated to the on/off switch and the drive circuit via the isolation circuit.

Embodiment 1

The following describes embodiments of the present disclosure in detail, with reference to the drawings. It should be noted that the embodiments described below each show a generic or specific example. The numerical values, shapes, materials, elements, the arrangement and connection of the elements, steps, the processing order of the steps, and the like described in the following embodiments are mere examples, and thus are not intended to limit the present disclosure. Therefore, among the elements in the following embodiments, elements not recited in any of the independent claims defining the most generic part of the concept of the present disclosure are described as arbitrary elements for other embodiments.

Figure 1A:
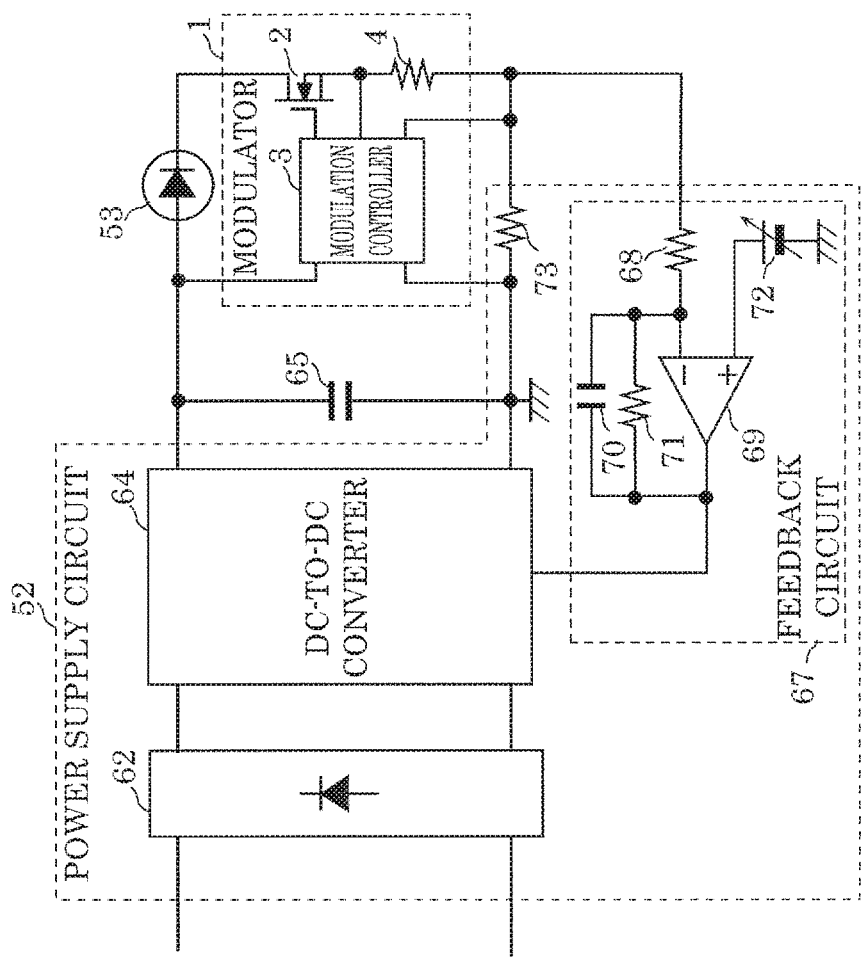
FIG. 1A is a block diagram illustrating an exemplary configuration of a visible light communication apparatus according to embodiment 1.

FIG. 1A is a block diagram illustrating an exemplary configuration of a visible light communication apparatus according to embodiment 1. FIG. 1A differs from FIG. 12A in that modulator 1 is included instead of modulator 100. Modulator 1 significantly differs from modulator 100 in that an isolation circuit is included.

The visible light communication apparatus as shown in FIG. 1A includes power supply circuit 52, load circuit 53, smoothing capacitor 65, and modulator 1.

Power supply circuit 52 includes rectifier bridge 62, DC-to-DC converter 64 (a voltage source), feedback circuit 67, and impedance circuit 73. Modulator 1 includes on/off switch 2, modulation controller 3, and current detection resistor 4. In power supply circuit 52, rectifier bridge 62 full-wave rectifies an input from the commercial power source (for example, alternating voltage 100V), and the rectified input is smoothed by capacitor 63 and converted into an intended direct voltage by DC-to-DC converter 64. Smoothing capacitor 65 is connected between the output terminals of DC-to-DC converter 64. A series circuit of load circuit 53 and on/off switch 2 and detection resistor 4 which are included in modulator 1 is connected in parallel to smoothing capacitor 65.

Feedback circuit 67 includes error amplifier 69, reference voltage source 72 connected to the positive input terminal of error amplifier 69, input resistor 68 connected to the negative input terminal of error amplifier 69, resistor 71 for gain adjustment and connected between the output terminal of error amplifier 69 and the negative input terminal of error amplifier 69, and capacitor 70 for phase compensation. In feedback circuit 67, error amplifier 69 compares the voltage drop across impedance circuit 73 and the voltage of reference voltage source 72, and amplifies the resultant difference to feed it back to DC-to-DC converter 64. In other words, the feedback control is applied to the DC-to-DC converter 64 such that the voltage drop across impedance circuit 73 becomes the same as the reference voltage of reference voltage source 72. This feedback control enables power supply circuit 52 to serve as a constant current power supply configured to maintain the average of output current constant. It should be noted that the dimming function can be implemented by changing the reference voltage potential of reference voltage source 72 in feedback circuit 67. In other words, as the reference voltage potential is decreased from a value at 100% lighting, the LED current decreases through the feedback control.

Modulator 1 is connected in series to load circuit 53, and turns on and off on/off switch 2 in accordance with a binary on/off signal to intermittently interrupt the LED current, thereby modulating the illumination light. Modulator 1 includes an isolation circuit, and thereby is configured to prevent the inner current of modulator 1 from flowing into impedance circuit 73 as much as possible.

Next, the configuration of modulator 1 will be described.

Figure 1B:
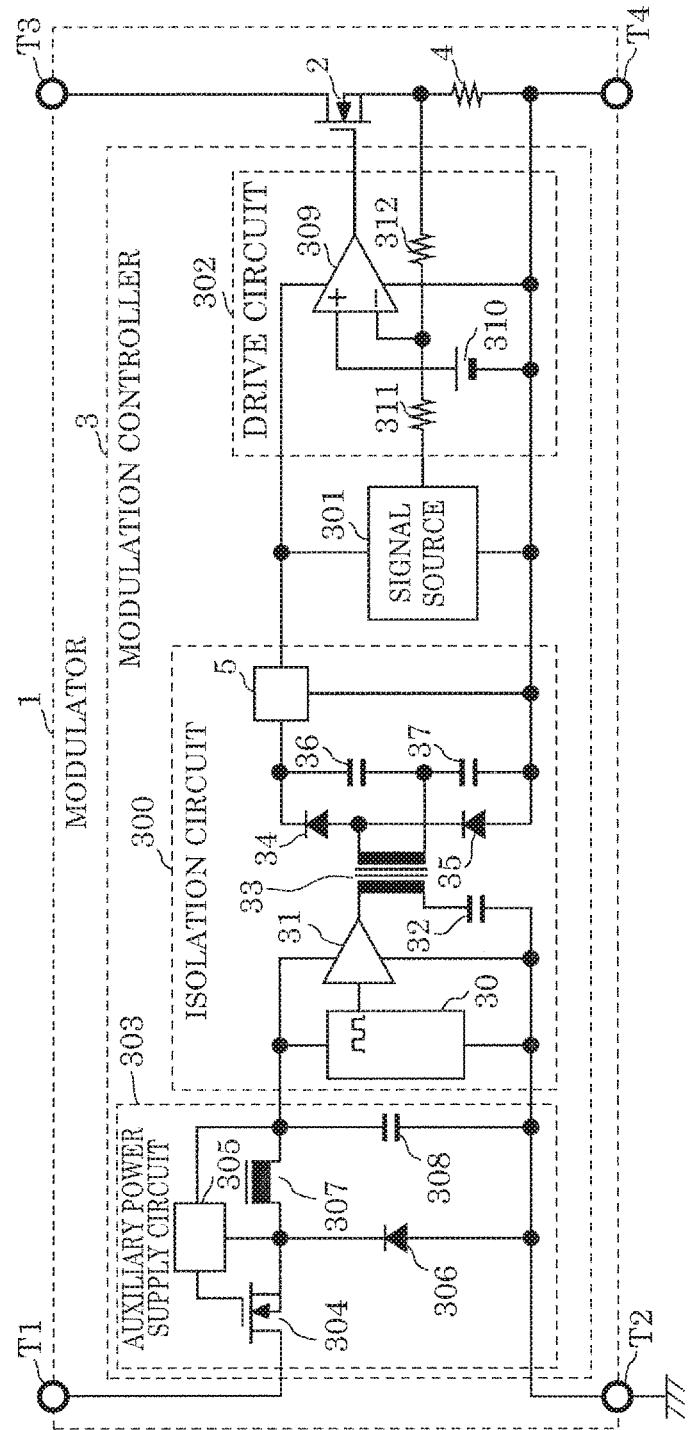
FIG. 1B is a circuit diagram illustrating an exemplary configuration of a modulator according to embodiment 1.

FIG. 1B is a circuit diagram illustrating an exemplary configuration of modulator 1 according to embodiment 1. Modulator 1 of this figure includes on/off switch 2, current detection resistor 4, and modulation controller 3.

On/off switch 2 intermittently interrupts the LED current flowing through load circuit 53 to perform modulation by superimposing a communication signal on illumination light. The on and off of on/off switch 2 are controlled by modulation controller 3.

Current detection resistor 4 is connected in series to load circuit 53 and on/off switch 2, and is for detecting the LED current (here, this is the same as a current flowing through current detection resistor 4 itself).

Modulation controller 3 includes isolation circuit 300, signal source 301, drive circuit 302, and auxiliary power supply circuit 303, and controls the on and off of on/off switch 2 to modulate the illumination light emitted from load circuit 53. Terminals T1 and T2 in FIG. 1B are connected to two output terminals of DC-to-DC converter 64. In other words, terminal T1 is connected to the high-voltage side output terminal of DC-to-DC converter 64. Terminal T2 is connected to ground-level output terminal of DC-to-DC converter 64. Terminal T3 is connected to load circuit 53. Terminal T4 is connected to one terminal of impedance circuit 73 and one terminal of input resistor 68 in feedback circuit 67.

Isolation circuit 300 transmits power while being electrically isolated. An example of isolation circuit 300 shown in FIG. 1B includes square wave oscillator 30, driver 31, capacitor 32, isolation transformer 33, diode 34, diode 35, capacitor 36, capacitor 37, and three terminal regulator 5. Square wave oscillator 30 generates a square wave, and provides the square wave to the primary winding side of isolation transformer 33 via driver 31. In other words, square wave oscillator 30 supplies power to the primary winding of isolation transformer 33. Square wave oscillator 30 may be, for example, a self-excited oscillation circuit capable of selectively setting a frequency of the square wave. In order to miniaturize isolation transformer 33, it is preferred that the frequency of the square wave is appropriately high. One terminal of isolation transformer 33 receives the square wave from driver 31. For coupling, capacitor 32 is connected to the other terminal of the primary winding of isolation transformer 33 (on the ground side). An output from the secondary winding of isolation transformer 33 is voltage-doubler rectified by diodes 34 and 35 and capacitors 36 and 37, and a direct voltage isolated from the primary winding can be obtained. The direct voltage of the second winding is provided to signal source 301 and drive circuit 302 via three terminal regulator 5.

Signal source 301 generates a binary communication signal (also referred to as an on/off signal). The binary communication signal may be an ID signal indicating an ID unique to the visible light communication apparatus, or a communication signal based on a signal inputted from an external apparatus. Signal source 301 of FIG. 1B is energized from the secondary winding of isolation transformer 33 via three terminal regulator 5. Signal source 301 may be configured as a hardware including a logic circuit, or a hardware including a microcomputer and its software, for example.

Drive circuit 302 turns on and off on/off switch 2 in accordance with the communication signal, and controls the current of on/off switch 2 based on the voltage potential detected by current detection resistor 4. Regarding to the current control, drive circuit 302 prevents a current flowing during the on period of on/off switch 2 from exceeding an intended level. The intended level is determined by the reference voltage potential of reference voltage source 310. The intended level and the reference voltage potential are set, for example, to suppress overshoot in the waveform of LED current flowing through load circuit 53. Specifically, drive circuit 302 includes operational amplifier 309 as a main component. Operational amplifier 309 has a positive terminal receiving the reference voltage potential of reference voltage source 310, and a negative terminal receiving a voltage obtained by dividing the voltage drop across current detection resistor 4 between resistor 311 and resistor 312.

Auxiliary power supply circuit 303 is connected between two output terminals of DC-to-DC converter 64 to generate an auxiliary supply voltage, and supplies power based on the generated auxiliary supply voltage to on/off switch 2 and drive circuit 302 via isolation circuit 300. In FIG. 1B, auxiliary power supply circuit 303 also supplies power to signal source 301 via isolation circuit 300. Accordingly, auxiliary power supply circuit 303 includes switching element 304, its drive circuit 305, regenerative diode 306, inductor 307 and smoothing capacitor 308, and forms a buck converter.

It should be noted that square wave oscillator 30 can drive isolation transformer 33 at any frequency, and thus the design of isolation transformer 33 is simplified, thereby allowing the optimal design for miniaturization.

Next, a current path in the visible light communication apparatus will be described.

Figure 2A:
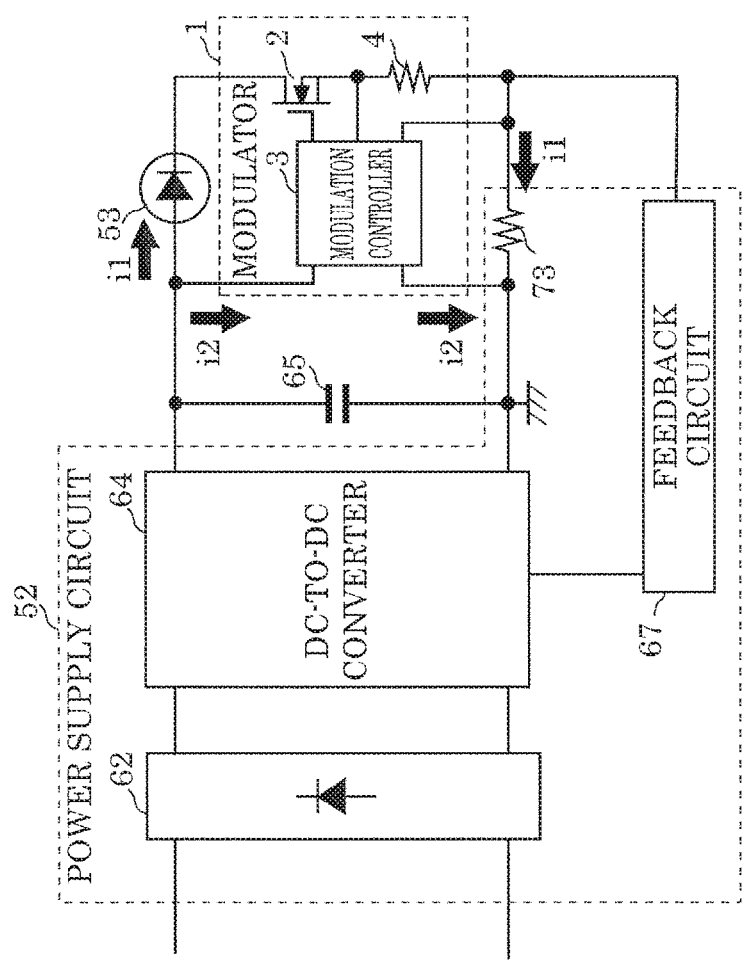
FIG. 2A is a diagram illustrating a current path in the visible light communication apparatus according to embodiment 1.
Figure 2B:
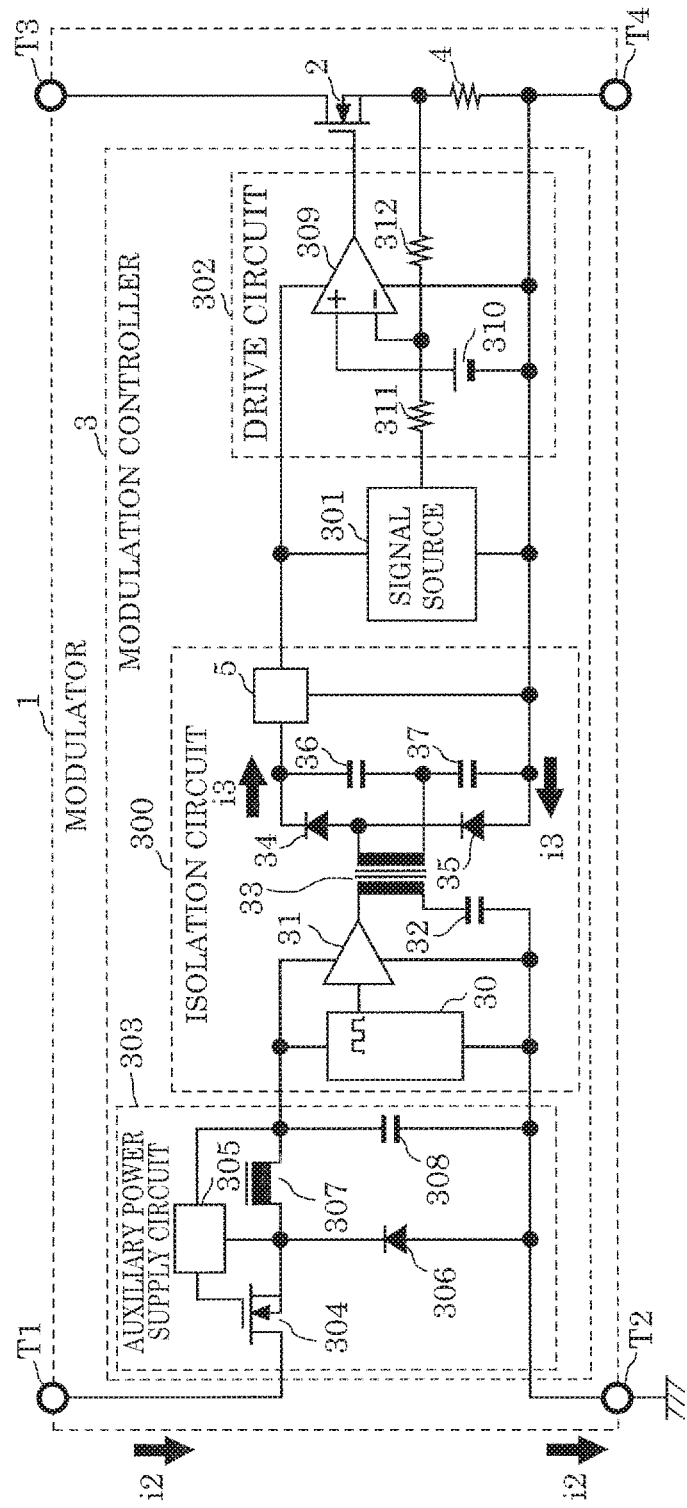
FIG. 2B is a diagram illustrating a current path in the modulator according to embodiment 1.

FIG. 2A is a diagram illustrating the current path in the visible light communication apparatus according to embodiment 1. In FIG. 2A, the current path is added to FIG. 1A. The output current from DC-to-DC converter 64 is divided into LED current i1 flowing into load circuit 53 and current i2 flowing into modulator 1. Current i2 does not flow through impedance circuit 73 which detects LED current i1, and thus the LED current is not decreased by the feedback control. FIG. 2B is a diagram illustrating a current path in modulator 1 according to embodiment 1. In FIG. 2B, the current path is added to FIG. 1B. Inner current i2 of modulator 1 flows into the ground of DC-to-DC converter 64 via the circuits on the primary winding side of isolation transformer 33, and does not flow through impedance circuit 73. Accordingly, inner current i2 does not cause a decrease in the LED current. Current i3 on the secondary winding side of isolation transformer 33 flows through signal source 301 and drive circuit 302. Inner current i3 in modulator 1 does not flow into the ground of DC-to-DC converter 64. Accordingly, inner current i3 does not cause a decrease in the LED current.

Figure 3:
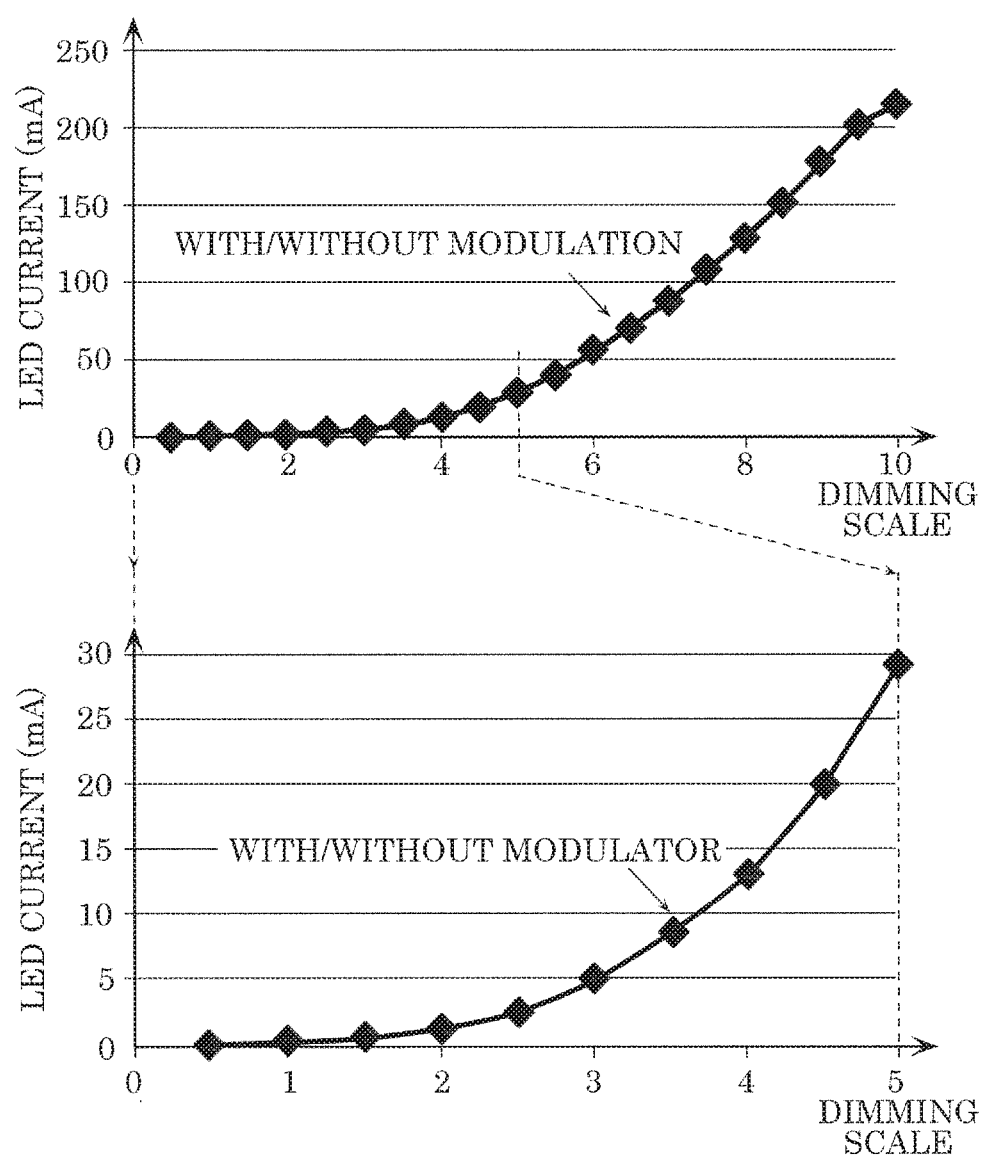
FIG. 3 is a diagram illustrating a LED current versus a dimming scale according to embodiment 1.

FIG. 3 is a diagram illustrating a LED current versus a dimming scale according to embodiment 1. The vertical axis represents the LED current. The horizontal axis represents "the dimming scale" indicating, for example, the position of a finger turned or slide knob on a dimmer which receives dimming operation from a user to output a dimming signal. Here, the dimming scale of 10 corresponds to the dimming ratio of 100%, and the dimming scale of 0 corresponds to the dimming ratio of 0%.

FIG. 3 shows the results of measuring the relationship between the dimming level (the dimming scale of from 0 to 10) and the average of LED current using power supply circuit 52 and load circuit 53 which has an average current of about 210 mA at 100% lighting (the dimming scale of 10), in both cases of with and without modulator 1. It should be noted that the inner current of modulator 1 used here is about 6 mA. As shown in the upper half of FIG. 3, there is no difference between both cases with and without modulator 1. The lower half of FIG. 3 is an enlarged view of the region below the dimming scale of 5 (14% dimming) in the upper half. Even in a deep dimming region, there is no difference between both cases with and without modulator 1, and the smooth dimming performance does not deteriorate. In FIG. 3, the visible light communication apparatus according to this embodiment does not deteriorate the dimming performance in the case with modulator 1.

Figure 4:
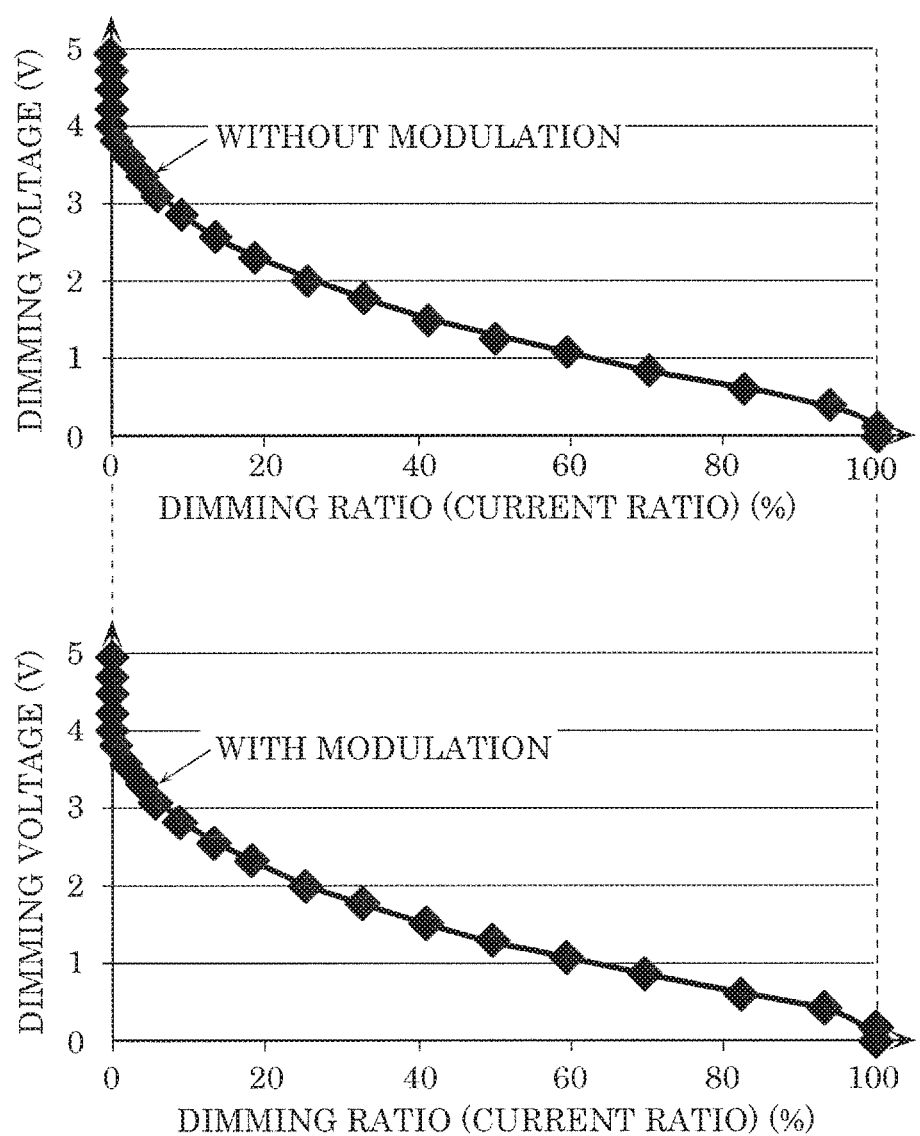
FIG. 4 is a diagram illustrating a LED current versus a dimming ratio according to embodiment 1.

FIG. 4 is a diagram illustrating a LED current versus a dimming ratio according to embodiment 1. The dimming voltage on the vertical axis defines the brightness in a range of from 0 V (100% brightness) to 5V (0% brightness). The dimming ratio on the horizontal axis represents a ratio of a current to the LED current at 100% lighting. FIG. 4 shows the results of measuring the relationship between a signal from the dimmer (a dimming voltage) and the dimming ratio under the same conditions as FIG. 3. Here, the dimming ratio (%) is defined as a ratio of a current to the average of LED current at 100% lighting (the dimming scale of 10, the dimming voltage of 0 V), and the dimming ratio is plotted with respect to the change in the dimming voltage. This figure also shows that there is no influence on the dimming performance due to the existence of modulator 1. The visible light communication apparatus according to this embodiment does not deteriorate the dimming performance in the case with modulator 1.

As described above, the visible light communication apparatus according to embodiment 1 includes: voltage source 64; smoothing circuit 65 connected to voltage source 64; load circuit 53 connected to voltage source 64 and including a light emitting diode; on/off switch 2 connected in series to load circuit 53; impedance circuit 73 connected in series to load circuit 53 and on/off switch 2; feedback circuit 67 that feeds back an error between a voltage drop across impedance circuit 73/73a and a reference voltage potential to voltage source 64 as a feedback signal; signal source 301 that generates a communication signal which is a binary signal; drive circuit 302 that turns on and off the on/off switch in accordance with the communication signal; isolation circuit 300 that transmits power while being electrically isolated; and auxiliary power supply circuit 303 that is connected between two output terminals of voltage source 64, generates an auxiliary supply voltage, and supplies power based on the auxiliary supply voltage generated to on/off switch 2 and drive circuit 302 via isolation circuit 300.

With this, it is possible to reduce the deterioration of dimming performance between when the visible light communication is performed and when the visible light communication is not performed.

Here, auxiliary power supply circuit 303 may supply power to signal source 301 via isolation circuit 300.

With this, the ground level of signal source 301 and the ground level of drive circuit 302 are the same, and thus signal source 301 and drive circuit 302 are easily designed, thereby simplifying the circuit configuration.

Here, drive circuit 302 may turn on and off on/off switch 2, and prevent a current flowing during the on period of on/off switch 2 from exceeding an intended level.

With this, it is further possible to suppress overshoot in the waveform of the LED current.

Here, feedback circuit 67 may include reference voltage source 72 which generates variable reference voltage potential, and control the output current from voltage source 64 in accordance with the dimming ratio by generating the reference voltage potential in accordance with the dimming ratio.

With this, the dimming is performed using the reference voltage of reference voltage source 72 in feedback circuit 67, and thus no additional complex circuit is needed to implement the dimming function. In other words, the dimming function can be easily implemented by a simple circuit (i.e. variable reference voltage source 72).

Here, impedance circuit 73 may be a resistance element that causes a voltage drop.

With this, it is further possible to configure impedance circuit 73 as a simple circuit.

Embodiment 2

In embodiment 1, an example in which the ground level of signal source 301 is the same as that of the isolated side (i.e. the secondary winding side of isolation transformer 33) is shown. In contrast, in embodiment 2, an example in which the ground level of signal source 301 is the same as that of the non-isolated side (i.e. the primary winding side of isolation transformer 33) will be described.

Figure 5:
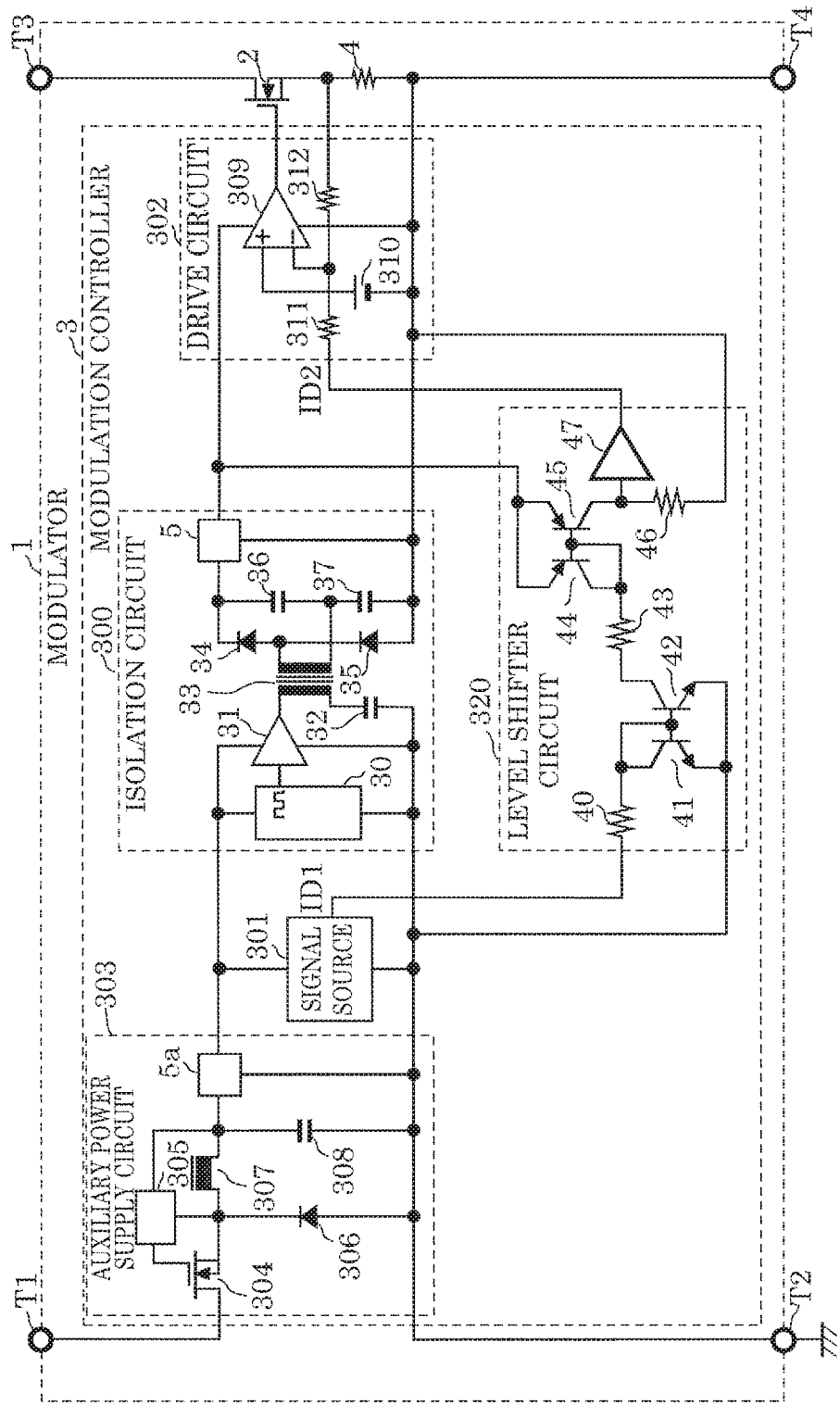
FIG. 5 is a circuit diagram illustrating an exemplary configuration of a modulator according to embodiment 2.

FIG. 5 is a circuit diagram illustrating an exemplary configuration of modulator 1 according to embodiment 2. FIG. 5 differs from FIG. 1B in that three terminal regulator 5a is added to auxiliary power supply circuit 303, the position of signal source 301 is changed from the isolated side to the non-isolated side of isolation circuit 300 (i.e. from the secondary winding side to the primary winding side of isolation transformer 33), and level shifter circuit 320 that level-shifts the communication signal is added. Hereinafter, the differences will be described in detail.

Three terminal regulator 5a in auxiliary power supply circuit 303 provides a constant supply voltage to signal source 301 on the basis of an auxiliary supply voltage generated by auxiliary power supply circuit 303.

Signal source 301 operates with reference to the ground level of the non-isolated side (i.e. the primary winding side of isolation transformer 33). This signal source 301 is configured as a microcomputer, and can not only generate the communication signal, but also perform control in accordance with a received dimming signal.

Level shifter circuit 320 level-shifts the communication signal generated by signal source 301, and provides the level-shifted communication signal to drive circuit 302. Accordingly, level shifter circuit 320 includes resistor 40, NPN transistors 41 and 42, resistor 43, PNP transistors 44 and 45, resistor 46, and buffer 47. The on/off signal (i.e. communication signal) from signal source 301 is provided via resistor 40 to two NPN transistors 41 and 42 which are connected in a mirror configuration with each other, and then provided via resistor 43 to two PNP transistors 44 and 45 which are connected in a mirror configuration with each other. The provided on/off signal is generated (i.e. level-shifted) as a voltage across resistor 46 connected to the collector of PNP transistor 45, and provided to drive circuit 302 via buffer 47.

FIG. 5 differs from FIG. 1B of embodiment 1 mainly in that the position of signal source 301 is changed from the isolated side of isolation circuit 300 (i.e. the secondary winding side of isolation transformer 33) to the non-isolated side (i.e. the primary winding side of isolation transformer 33) at the input stage of drive circuit 302. This purpose is to enhance the dimming controllability of the modulator by the microcomputer in signal source 301. A dimming signal from an external dimmer is provided with reference to the ground voltage potential of power supply circuit 52. For example, in a use for causing signal source 301 to change modulation conditions in accordance with the dimming level, it is reasonable that the microcomputer in signal source 301, which receives the dimming signal, is configured to set the base to the same ground as the dimming signal. In this case, the on/off signal from the microcomputer in signal source 301 needs to be adjusted to the on/off switch 2 side having a different ground voltage potential, and thus level shifter circuit 320 is provided.

Instead of the level-shifting of the on/off signal, it is also possible to level-shift a dimming signal from outside. However, when the dimming signal is provided at a DC level of an analog signal, such a level shifter needs to exactly transmit the DC level. In contrast, when the on/off signal is level-shifted as shown in FIG. 5, it is sufficient that the timing of change in the on/off signal is transmitted. Accordingly, level shifter circuit 320 is simplified in the design and the circuit configuration.

Figure 6:
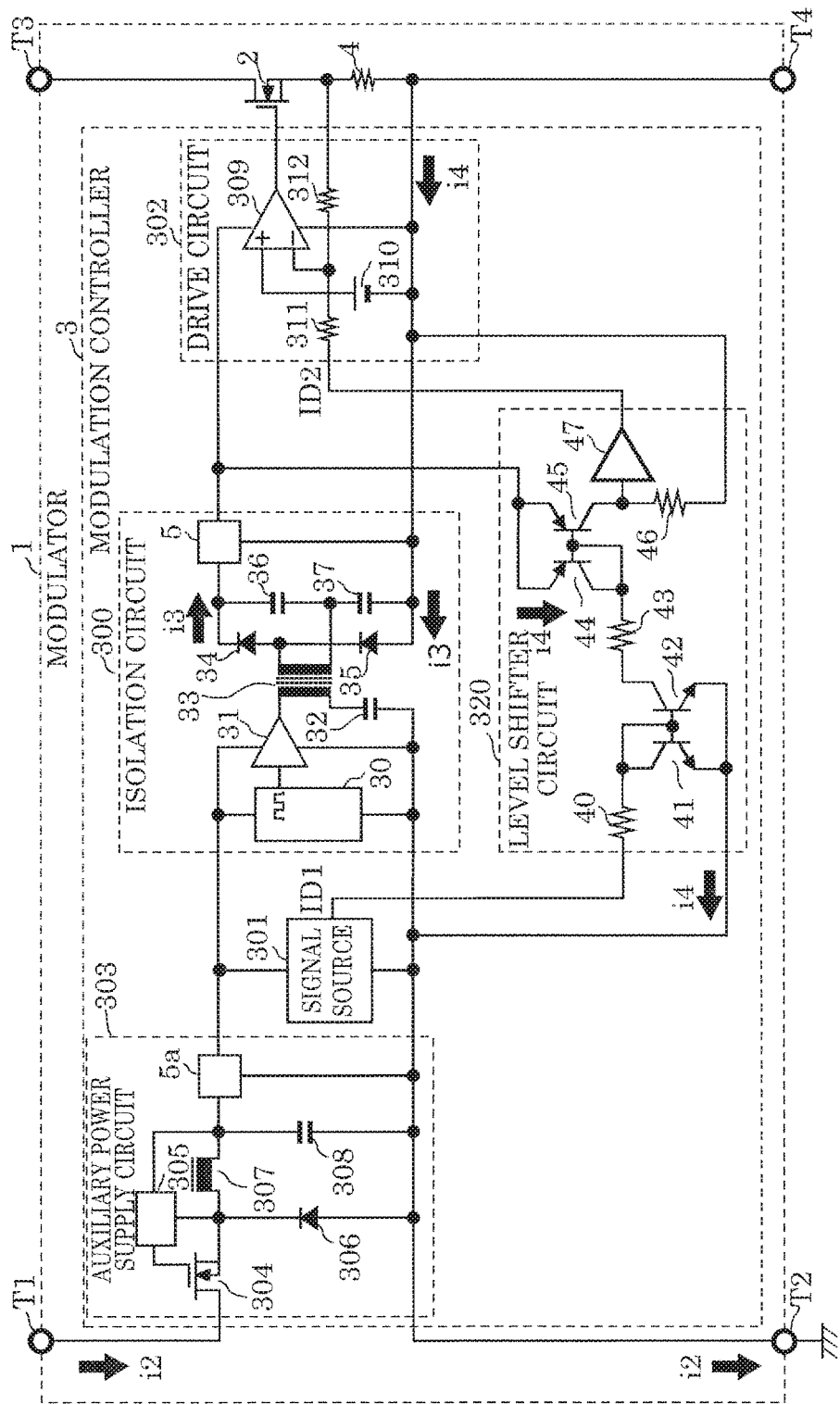
FIG. 6 is a diagram illustrating a current path in the modulator according to embodiment 2.

FIG. 6 is a diagram illustrating a current path in modulator 1 according to embodiment 2. In FIG. 6, the current path is added to FIG. 5. Current i2 flowing through auxiliary power supply circuit 303 flows into the ground of power supply circuit 52, and thus current i2 does not cause a decrease in the LED current. Furthermore, it is predicted that current i3 flowing through the output side of isolation transformer 33 mostly flows through drive circuit 302 only, whereas a part of current i3 flows into level shifter circuit 320 as current i4 and reversely flows through impedance circuit 73 for detecting a load current. Accordingly, although the LED current increases by the amount of current i4, current i4 in level shifter circuit 320 necessary to transmit the on/off signal can be set to an extremely small value. Specifically, when current i4 in the level shifter circuit is set to about 100 nA, the results of measuring the dimming performance show no difference from the dimming performance shown in embodiment 1 (FIG. 3, FIG. 4).

As described above, in the visible light communication apparatus according to embodiment 2, auxiliary power supply circuit 303 supplies power to signal source 301 without the power passing through isolation circuit 300, the visible light communication apparatus further includes level shifter circuit 320 that level-shifts the communication signal generated by signal source 301 and provides the communication signal level-shifted to drive circuit 302.

With this, it is possible to reduce the deterioration of dimming performance between when the visible light communication is performed and when the visible light communication is not performed. Furthermore, the ground of signal source 301 equals to the ground of the non-isolated side of isolation circuit 300 (the input side of the primary winding of isolation transformer 33) which has the same ground as the dimming signal, and signal source 301 can easily perform modulation in accordance with dimming operation, thereby enhancing the controllability of signal source 301.

Embodiment 3

In embodiment 3, an example in which impedance circuit 73 is additionally provided with a function of controlling a LED current to a level corresponding to a dimming signal will be described.

Figure 7:
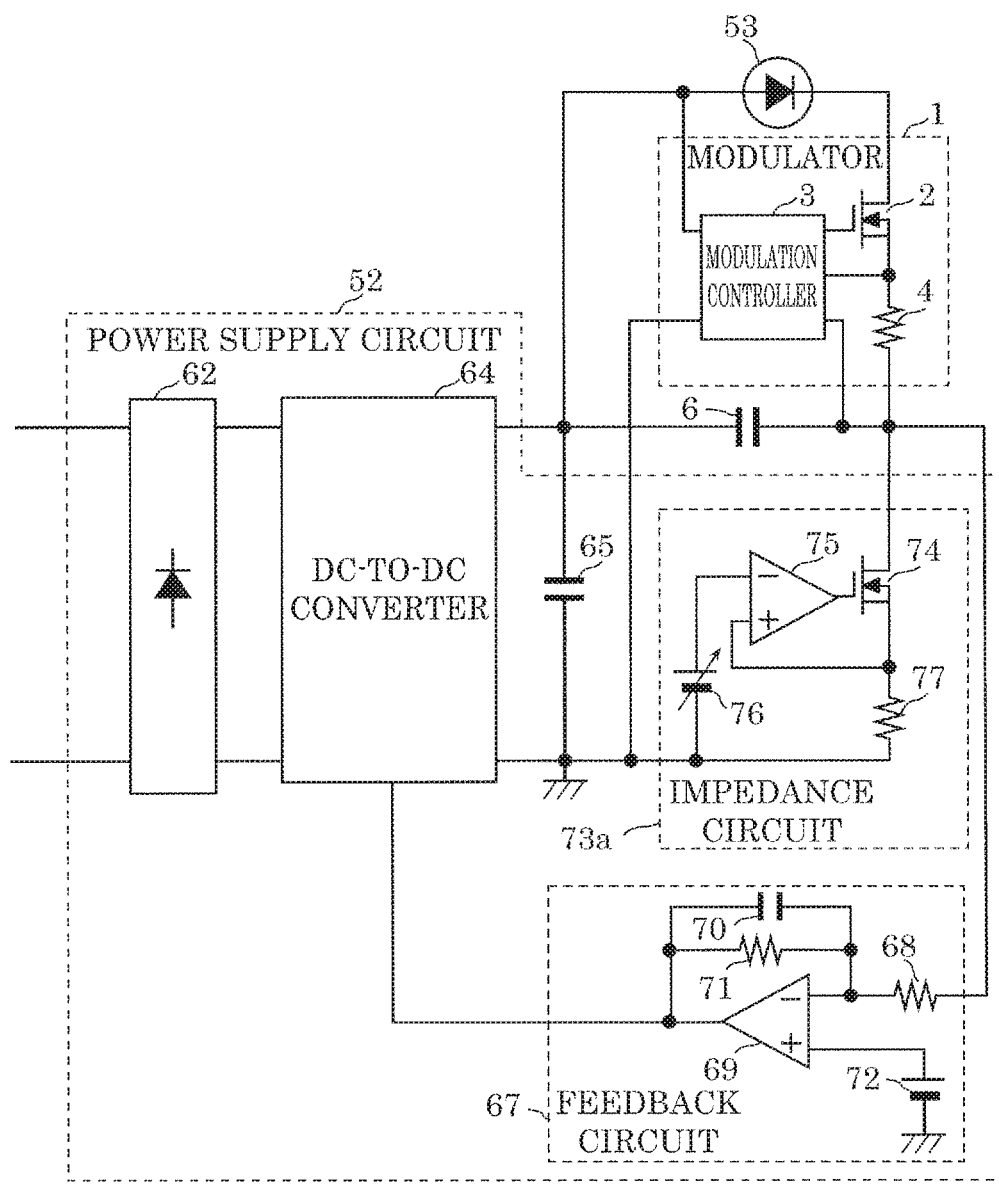
FIG. 7 is a block diagram illustrating an exemplary configuration of a visible light communication apparatus according to embodiment 3.

FIG. 7 is a block diagram illustrating an exemplary configuration of a visible light communication apparatus according to embodiment 3. FIG. 7 differs from FIG. 1B in that reference voltage source 72 in feedback circuit 67 is changed from variable to fixed, and impedance circuit 73a is included instead of impedance circuit 73. Hereinafter, the differences will be described in detail.

Reference voltage source 72 in feedback circuit 67 need not be variable, and thus is fixed. This purpose is to implement the dimming function according to this embodiment as not feedback circuit 67 but impedance circuit 73a.

Impedance circuit 73a includes a current detection function of representing a LED current as a voltage drop across impedance circuit 73a, and also includes a dimming function of controlling the LED current to a level corresponding to a dimming signal. Accordingly, impedance circuit 73a includes MOSFET 74, current detection resistor 77, operational amplifier 75, and reference voltage source 76. The voltage drop across current detection resistor 77 is connected to the negative input terminal of operational amplifier 75 as a signal indicating the LED current, and the reference voltage potential of reference voltage source 76 is connected to the positive input terminal of operational amplifier 75. A voltage across a series circuit of MOSFET 74 and current detection resistor 77 is fed back to a controller of DC-to-DC converter 64 via feedback circuit 67. DC-to-DC converter 64 serves as a constant current power supply configured to maintain the average of output current constant through the feedback control. With this configuration, the dimming function can be easily implemented by changing the reference voltage potential of reference voltage source 76. In other words, as the reference voltage potential of reference voltage source 76 is decreased from a value at 100% lighting, impedance circuit 73a controls current to increase a voltage across impedance circuit 73a. However, the feedback circuit controls the output from DC-to-DC converter 64 to optimize the voltage. Modulator 1 includes isolation circuit 300, and prevents a decrease in the LED current due to an inner current of modulator 1. The specific configuration and operation of modulator 1 are the same as those shown in FIG. 1B of embodiment 1. It should be noted that modulator 1 may be the same as that shown in FIG. 5 of embodiment 2.

As described above, in the visible light communication apparatus according to embodiment 3, impedance circuit 73a causes a voltage drop and controls a current flowing through impedance circuit 73a in accordance with the dimming ratio.

With this, it is possible to reduce the deterioration of dimming performance between when the visible light communication is performed and when the visible light communication is not performed. Furthermore, the dimming function can be more easily and finely implemented by changing the reference voltage potential of reference voltage source 76 in impedance circuit 73a than when changing the reference voltage potential of reference voltage source 72 in feedback circuit 67.

Here, impedance circuit 73a may include: a transistor (MOSFET 74) connected in series to load circuit 53 and on/off switch 2; current detection resistor 77 connected in series to the transistor (MOSFET 74), the current detection resistor being for detecting a current flowing through load circuit 53 as the voltage drop; reference voltage generation circuit 76 that generates the reference voltage potential in accordance with the dimming ratio; and error amplifier 75 that generates a control signal in accordance with the error between the voltage drop and the reference voltage potential, and provides the control signal to the transistor (MOSFET 74).

It should be noted that in FIG. 1A, load circuit 53, modulator 1, and impedance circuit 73 are connected in series in the stated order, but may be connected in a different order. Also in FIG. 7, load circuit 53, modulator 1, and impedance circuit 73a are connected in series in the stated order, but may be connected in a different order.

Furthermore, drive circuit 302 in modulator 1 shown in FIG. 7 need not have the current control function of drive circuit 302 shown in FIG. 1B and FIG. 5, and may be a simple buffer circuit as shown in FIG. 8B.

It should be noted that modulator 1 shown in FIG. 1A and FIG. 7 may be attachable to the visible light communication apparatus.

While the visible light communication apparatus according to one or more aspects of the present disclosure has been described with reference to the embodiments, the present disclosure is not limited to the embodiments. Various modifications to the embodiments that may be conceived by a person skilled in the art or combinations of the components of different embodiments are intended to be included within the scope of the one or more aspects of the present disclosure, without departing from the spirit of the present disclosure.

For example, some or the whole of each of the processing units included in the visible light communication apparatus according to the above embodiments may be implemented in LSIs which are integrated circuits. They may be mounted on one chip, or a part or the whole of the system LSIs may be mounted on one chip.

The components according to the above embodiments may be implemented in a form of dedicated hardware. Alternatively, the components may be implemented through execution of a software program suited for each component. Each component may be implemented by a program execution unit, such as central processing unit or processor, loading and executing the software program stored in a storage medium such as a hard disk or a semiconductor memory.

Furthermore, the circuit configurations illustrated in the circuit diagrams are merely by way of example and the present disclosure is not limited to the circuit configurations. Specifically, circuits which can implement the characteristic features of the present disclosure as with the circuit structures described above are included in the present disclosure. For example, a certain element having an element, such as a switching element (transistor), a resistance element, or a capacitor element connected thereto in series or in parallel is also included in the present disclosure to an extent that can achieve the same or similar functionality obtained from the circuit structures described above. In other words, "connected" in the above embodiments is not limited to directly connecting two terminals (nodes), and includes connecting two terminals (nodes) via an element to an extent that can achieve the same or similar functionality obtained from the circuit structures described above.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A visible light communication apparatus, comprising:
   a voltage source;
   a smoothing circuit connected to the voltage source;
   a load circuit connected to the voltage source and including a light emitting diode;
   an on/off switch connected in series to the load circuit;
   an impedance circuit connected in series to the load circuit and the on/off switch;
   a feedback circuit that feeds back an error between a voltage drop across the impedance circuit and a reference voltage potential to the voltage source as a feedback signal;

a signal source that generates a communication signal which is a binary signal;

a drive circuit that turns on and off the on/off switch in accordance with the communication signal;

an isolation circuit that transmits power while being electrically isolated; and an auxiliary power supply circuit that is connected between two output terminals of the voltage source, generates an auxiliary supply voltage, and supplies power based on the auxiliary supply voltage generated to the on/off switch and the drive circuit via the isolation circuit.

2. The visible light communication apparatus according to claim 1, wherein the auxiliary power supply circuit supplies power to the signal source without the power passing through the isolation circuit, the visible light communication apparatus further comprising: a level shifter circuit that level-shifts the communication signal generated by the signal source and provides the communication signal level-shifted to the drive circuit.

3. The visible light communication apparatus according to claim 1, wherein the auxiliary power supply circuit supplies power to the signal source via the isolation circuit.

4. The visible light communication apparatus according to claim 1, wherein the drive circuit turns on and off the on/off switch, and prevents a current flowing during an on period of the on/off switch from exceeding an intended level.

5. The visible light communication apparatus according to claim 1, wherein the feedback circuit includes a reference voltage source that generates the reference voltage potential which is variable, and controls an output current from the voltage source in accordance with a dimming ratio by generating the reference voltage potential in accordance with the dimming ratio.

6. The visible light communication apparatus according to claim 1, wherein the impedance circuit causes the voltage drop, and controls a current flowing through the impedance circuit in accordance with a dimming ratio.

7. The visible light communication apparatus according to claim 6, wherein the impedance circuit includes:

a transistor connected in series to the load circuit and the on/off switch;

a current detection resistor connected in series to the transistor, the current detection resistor being for detecting a current flowing through the load circuit as the voltage drop;

a reference voltage generation circuit that generates the reference voltage potential in accordance with the dimming ratio; and an error amplifier that generates a control signal in accordance with the error between the voltage drop and the reference voltage potential, and provides the control signal to the transistor.

8. The visible light communication apparatus according to claim 1, wherein the impedance circuit is a resistance element that causes the voltage drop.

* * * * *